(12) United States Patent
Gray et al.

(10) Patent No.: US 9,378,581 B2
(45) Date of Patent: Jun. 28, 2016

(54) APPROACHES FOR HIGHLIGHTING ACTIVE INTERFACE ELEMENTS

(75) Inventors: Timothy T. Gray, Seattle, WA (US); Mark R. Privett, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 196 days.

(21) Appl. No.: 13/418,523

(22) Filed: Mar. 13, 2012

(65) Prior Publication Data

US 2013/0246954 A1    Sep. 19, 2013

(51) Int. Cl.
*G06T 15/20* (2011.01)
*G06F 3/048* (2013.01)
*G06F 1/16* (2006.01)
*G06F 3/0489* (2013.01)
*G06F 3/0481* (2013.01)

(52) U.S. Cl.
CPC .............. *G06T 15/20* (2013.01); *G06F 1/1694* (2013.01); *G06F 3/04815* (2013.01); *G06F 3/04895* (2013.01); *G06T 2215/16* (2013.01)

(58) Field of Classification Search
CPC .. G09G 2340/04; G06F 3/012; G06F 3/04815
USPC .......................................................... 715/767
See application file for complete search history.

(56) References Cited

U.S. PATENT DOCUMENTS

| | | | |
|---|---|---|---|
| 5,574,836 A * | 11/1996 | Broemmelsiek | 345/427 |
| 2003/0122777 A1* | 7/2003 | Grover | 345/156 |
| 2003/0142143 A1 | 7/2003 | Brown et al. | |
| 2003/0234799 A1* | 12/2003 | Lee | 345/660 |
| 2004/0075735 A1 | 4/2004 | Marmaropoulos | |
| 2004/0212626 A1 | 10/2004 | Lyxzen et al. | |
| 2005/0059488 A1* | 3/2005 | Larsen et al. | 463/36 |
| 2005/0253807 A1* | 11/2005 | Hohmann et al. | 345/156 |
| 2007/0164988 A1* | 7/2007 | Ryu et al. | 345/156 |
| 2008/0307364 A1* | 12/2008 | Chaudhri et al. | 715/836 |
| 2009/0128482 A1* | 5/2009 | Richardson | 345/156 |
| 2009/0179914 A1* | 7/2009 | Dahlke | 345/619 |
| 2009/0313584 A1* | 12/2009 | Kerr et al. | 715/849 |

(Continued)

FOREIGN PATENT DOCUMENTS

| | | |
|---|---|---|
| CN | 104364753 | 2/2015 |
| EP | 0816983 | 1/1998 |

(Continued)

OTHER PUBLICATIONS

Cody Lee iOS 5's Voice-to-Text Feature Finally Revealed Aug. 6, 2011 4 pages.*

(Continued)

*Primary Examiner* — Andrea Long
(74) *Attorney, Agent, or Firm* — Polsinelli LLP (57) ABSTRACT

A graphical user interface can provide a three-dimensional appearance that is consistent for changes in a current location or point of view of a user. The user's point of view can be determined by analyzing images showing a current relative location of the user with respect to the device, and motion sensors operable to provide information about changes in orientation or position of the device. In addition to point of view updates, the interface can render active elements such that the elements appear to be closer to an outer surface of the display element. Such rendering can enable the user to easily determine which elements are active, such as may be used to provide text input to the device.

22 Claims, 7 Drawing Sheets

(56) References Cited

U.S. PATENT DOCUMENTS

| | | | |
|---|---|---|---|
| 2010/0079371 A1* | 4/2010 | Kawakami et al. | 345/156 |
| 2010/0088100 A1 | 4/2010 | Lindahl | |
| 2010/0097446 A1 | 4/2010 | Miyazaki et al. | |
| 2010/0125816 A1* | 5/2010 | Bezos | 715/863 |
| 2010/0265181 A1* | 10/2010 | Shore | G06F 3/04886 345/168 |
| 2010/0295958 A1 | 11/2010 | Larsson et al. | |
| 2011/0115788 A1 | 5/2011 | Lee | |
| 2011/0221776 A1* | 9/2011 | Shimotani et al. | 345/647 |
| 2011/0254865 A1 | 10/2011 | Yee et al. | |
| 2012/0036433 A1* | 2/2012 | Zimmer et al. | 715/702 |
| 2012/0212510 A1* | 8/2012 | Hewitt et al. | 345/650 |
| 2013/0141324 A1* | 6/2013 | Zambrano et al. | 345/156 |
| 2013/0181892 A1* | 7/2013 | Liimatainen et al. | 345/156 |

FOREIGN PATENT DOCUMENTS

| | | |
|---|---|---|
| EP | 2825945 | 1/2015 |
| JP | 2010-092430 | 4/2010 |
| JP | 2011-209854 | 10/2011 |
| JP | 2012-527666 | 11/2012 |
| JP | 2013-537670 | 10/2013 |
| JP | 2015-516624 | 6/2015 |
| WO | WO 2011/059270 | 5/2011 |
| WO | WO 2013/138489 | 9/2013 |

OTHER PUBLICATIONS

International Search Report and Written Opinion issued in corresponding PCT Application No. PCT/US13/30965 dated May 28, 2013 (9 pages).

International Preliminary Report on Patentability for PCT Application No. PCT/US2013/030965, mailed on Sep. 25, 2014, 7 pages.

Extended Search Report for European Patent Application No. 13762036.5, mailed on Nov. 5, 2015, 8 pages.

\* cited by examiner

APPROACHES FOR HIGHLIGHTING ACTIVE INTERFACE ELEMENTS

BACKGROUND

People are increasingly utilizing portable computing devices for a variety of purposes. Due to factors such as the small form factor of these devices and the amount of information to be rendered, it often can be difficult for a user to determine which interface elements are active and able to receive input. It also can be difficult for a user to ensure that the user has selected the appropriate element, as the relative size of the user's finger to a rendered element can make it difficult to accurately select a desired element. These issues can be exacerbated at off-axis viewing angles, such as where the device is placed flat on a table or the user is otherwise positioned at a position other than directly in front of the device.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to enabling a user to interact with an electronic device. In particular, various approaches enable interfaces to be rendered using a point of view that is consistent with a current relative position of a user. Further, various embodiments enable active interface elements to be highlighted in the renderings of those interfaces, such as by bringing an active element "forward" toward the front of the display screen in a three-dimensional display or quasi-three-dimensional rendering on a two-dimensional display element. The relative position of the user can be determined by capturing image information using at least one camera of a computing device, and analyzing that image information to determine a relative position of the user's head or eyes with respect to the device. Changes in the orientation and/or position of the computing device can also be monitored using at least one motion sensor of the device, in order to provide for a higher sampling frequency than might otherwise be possible using the image information captured by the camera, or otherwise attempt to improve the relative position determinations. A user can view and interact with active elements of the interface, and can maneuver through the various interface elements using various approaches discussed and suggested herein.

Various other applications, processes and uses are presented below with respect to the various embodiments.

Figure 1:
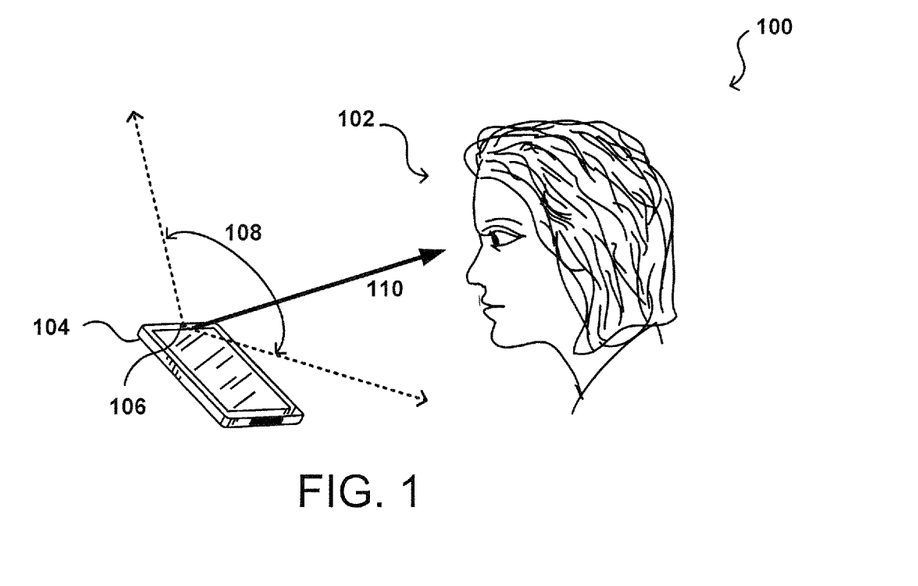
FIG. 1 illustrates an example situation where a user can view content and interact with a computing device in accordance with various embodiments.

FIG. 1 illustrates an example situation 100 wherein a user 102 is interacting with a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, video gaming consoles or controllers, and portable media players, among others. In this example, the computing device 104 has a camera 106 operable to perform functions such as image and/or video capture. The device can include additional image capture elements as well, as may include at least one other camera, a charge-coupled device (CCD), a motion detection sensor, or an infrared sensor, among others. In this example, the user 102 is located in a relative position with respect to the device, such that the point of view of the user follows a determinable trajectory 110 between the user's head or eyes and the device. As discussed later herein, the device can use information such as the resolution and field of view 108 of the camera 106, as well as the position of the user's head or eyes in the captured images, to determine the current point of view of the user. The point of view can be used to render an interface on a display screen or other such element of the computing device with a perspective that is consistent with the user's current point of view. The rendering can update as the determined point of view changes as a result of movement of the user and/or the computing device. The rendering can utilize three-dimensional mapping information, such as a set of layer depths or z-levels, to determine how to relate various interface elements to each other, as well as how to render those elements from the current user point of view.

Figure 2:
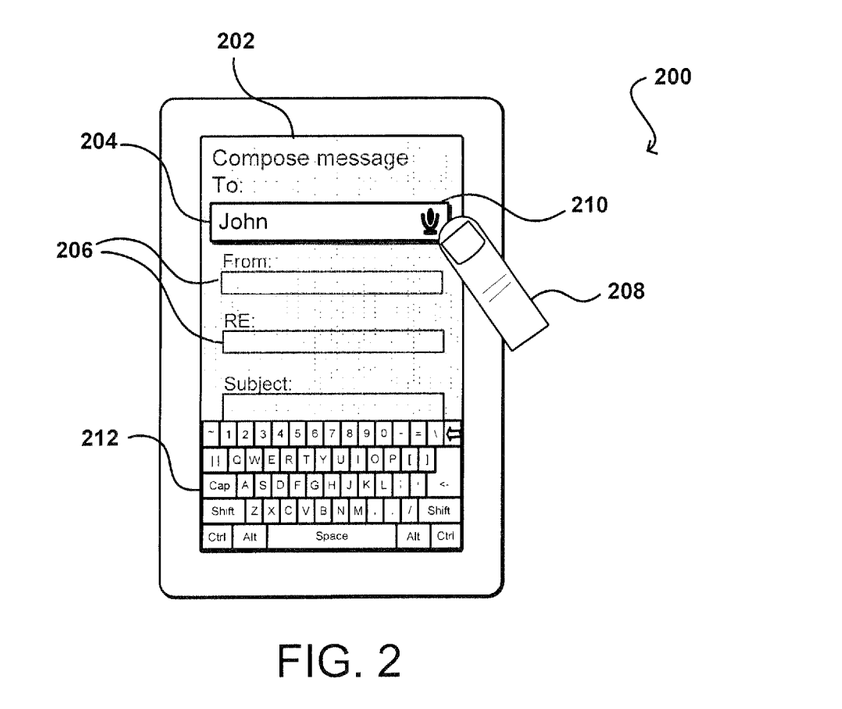
FIG. 2 illustrates an example interface display that can be provided in accordance with various embodiments.

For example, FIG. 2 illustrates an example interface display on a display screen 202 of a computing device. In this example, the user has accessed an email application and is filling out a form field to generate an email message to be sent to another user. It should be understood, however, that aspects of the various embodiments can be used with a variety of types of interface, which can include a wide variety of different interface elements with which a user can interact. In this example the user is able to select an interface element by touching an area of the display screen 202 that is associated with that interface element. Approaches for enabling a user to interact with a touch-sensitive display screen using a finger 208 or other such object are well known in the art and as such will not be discussed in detail herein. Various other selection approaches can be used as well, such as to move a cursor, perform a gesture, or speak a voice command, among others. In this example, the user selects a "To:" field 204 in order to enter text into that field. In at least some embodiments, selecting an interface element can cause that element to become "active," or otherwise enable the user to interact with that field in some way. As mentioned, the user in this example is able to enter text into the active field 204. The user can utilize a virtual keypad 212 or other such mechanism to enter text into the field. As discussed, a user can also perform gestures in some embodiments that are able to be interpreted as text to be entered into the active field. If voice input is active, the user can speak words, letters, or other input that is able to be interpreted by the device and entered into (or otherwise accepted as input with respect to) the active field 204. In this example, a microphone icon 210 or other such graphical element can be displayed in, or in relation to, the active field such that the user can determine the active field to receive input, as well as the ability of the device to accept voice or audio input. Various voice and speech recognition algorithms are known in the art that can be used to interpret speech input and provide corresponding text input, and as such these algorithms will not be discussed herein in detail.

As mentioned, the device 200 can also alter the rendering of an interface element when that element becomes active. In this example, the interface is rendered to have two different "levels" or z-depths, with an active element 204 being mapped to, or otherwise associated with, the upper level (near the outer surface of the display screen) and the inactive elements 206 or other interface components associated with a lower level of the interface (separated a distance from the outer surface of the display screen). In this example, the user is determined to be directly "in front" of the device, as discussed elsewhere herein, such that the interface is rendered from a "normal" perspective. It should be understood that terms such as "upper," "front" and "normal" are used for purposes of explanation and are not intended to require a specific orientation or relationship unless otherwise stated herein. In this example, the "To:" field 204 has been selected as the active field, and as such is rendered to appear to be in the upper level. Such rendering can take many forms, such as slightly enlarging the element, creating or adjusting a rendered shadow for the element, increasing a sharpness or focus level of the element, adjusting a color or shading of the element, etc. Various other elements, such as the virtual keypad 212 that the user can use to input text, can be rendered to appear to be located on the upper level as well.

As illustrated in this example, the "inactive" elements or other elements of the interface can be rendered to appear to be located at the lower level of the interface. For example, form fields 206 that are not selected and active can be rendered slightly smaller than an active field, might have shading, blur, or less color intensity to make the elements appear to be further back, etc. In various embodiments, the interface can be at least somewhat animated, such that a field that is selected to be active can slowly adjust in appearance to have that field appear to move "forward" and the previously active element can slowly adjust in appearance to have that element appear to move "backward" in the interface. Various other approaches can be used as well as should be apparent in light of the teachings and suggestions contained herein.

Figure 3A:
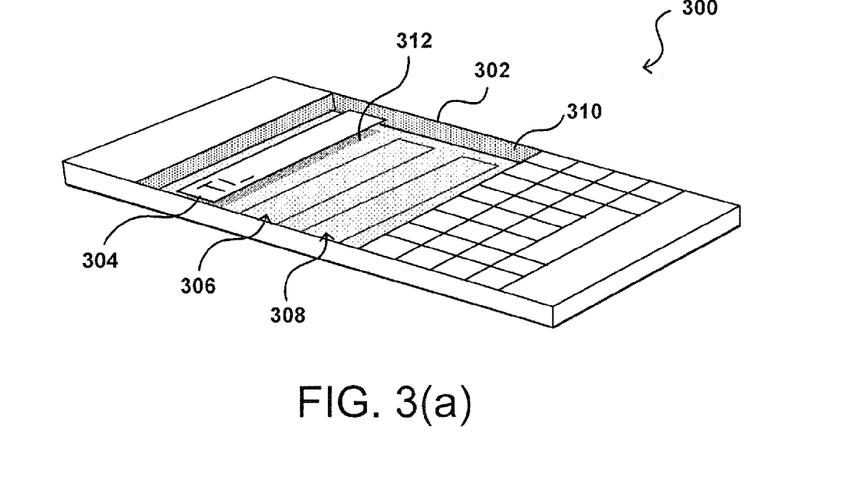
FIGS. 3(a) and 3(b) illustrate a various states of an interface that can be rendered in accordance with various embodiments.

The rendering of these elements can also change as the relative position of the user's head with respect to the device changes, such that the user has a different point of view with respect to the device. For example, FIG. 3(a) illustrates an example state 300 of a computing device wherein the device is at an angle with respect to the user (in this example assumed to be at the location of the reader in front of the page). In this example, the interface can adjust the rendering of shadows 312 associated with the elements of the upper layer to make those layers appear to be higher in the interface, as well as to give a three-dimensional appearance as each shadow can move in position relative to an associated element as the point of view changes, for example, to give the impression of an actual shadow being cast by the upper level element. Further, the interface can render sidewalls 310 or other elements that appear to provide a depth of the virtual interface from the point of view of the user, and the extent and shape of these elements can adjust with changes in point of view as well. For example, no side walls 310 were seen in the straight-on view of FIG. 2, but the amount of sidewall displayed can increase with increases in viewing angle. Various other behaviors can be used as well to mimic three-dimensional behavior. In this example, elements 306, 308 of the lower level are rendered with no shadow, and are associated with the bottom edge of the sidewalls 310, to appear to be part of the lower level of the interface. As mentioned, shadows, graying, slight blur, lower color depth, or other such approaches can be used to give the inactive elements the appearance of being at a lower z-depth. In at least some interfaces there might be more than two levels, and the amount of shadowing, color adjusting, and other such aspects can depend at least in part upon the level with which the element is associated. In at least some embodiments, however, the elements should be able to be read by the user regardless of their apparent level in the interface, such that the user can select an intended element to become active.

Figure 3B:
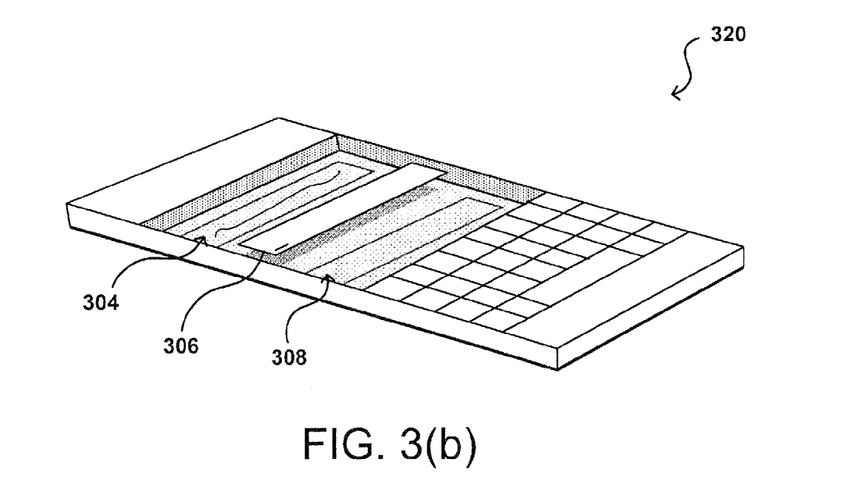

As discussed previously, the rendering of the interface elements can change as a result of different elements being active, with the rendering changes also being dependent at least in part upon the point of view of the user. For example, in the device state 320 of FIG. 3(b), a different field 306 is now active and is rendered such that the field appears to be located at the upper level of the interface. The user can now determine that the field is ready to receive input. Also, the previously active field 304 is changed in rendering to appear to be associated with the lower level, such that the user knows that the field is no longer able to accept input, unless that field is selected again (or another such action occurs). The changes can again be animated, to make it further apparent to the user that the active field has changed.

As illustrated, the rendering of an interface can depend not only on active fields or user selections, but also on the current point of view of the user. As the user rotates the device or moves with respect to the device, the device can update the rendering of the interface to make the three-dimensional appearance of the interface consistent with the change in point of view. In order to provide such consistency, the device can include functionality to track or otherwise determine the relative position of at least one feature of a user with respect to the device.

Figure 4A:
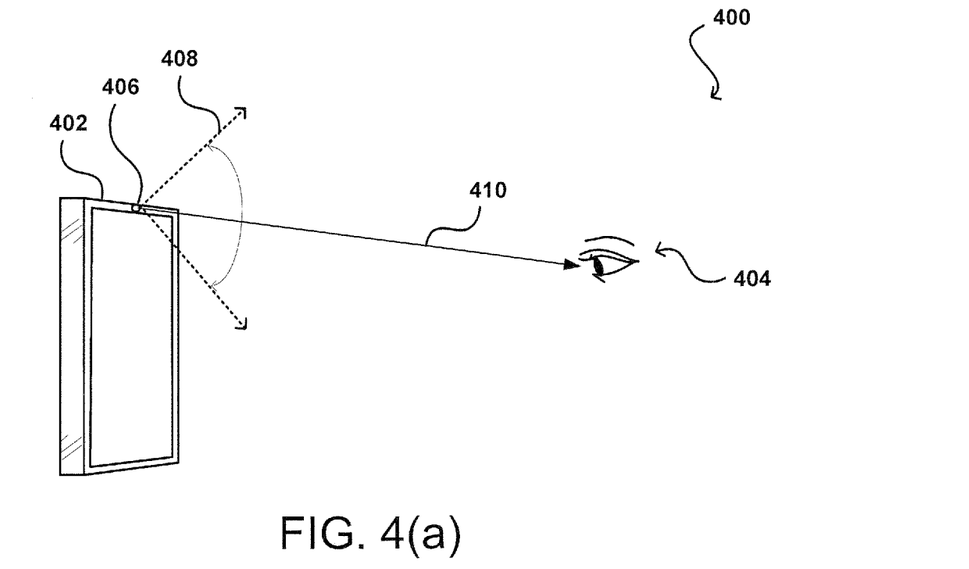
FIGS. 4(a) and (b) illustrate an example approach to determining the relative position of a user that can be utilized in accordance with various embodiments.

In at least some embodiments, a computing device can utilize one or more cameras or other such sensors to determine the relative direction of the user. For example, FIG. 4(a) illustrates an example situation 400 wherein a computing device 402 is configured to utilize at least one camera element 406 to attempt to locate a feature of a user, such as the user's head or eyes, for purposes of point of view determination. In this example, the user's eyes 404 are located within the field of view 408 of a camera of the computing device 402. As discussed elsewhere herein, however, the point of view of a user can be determined using positions of the user's eyes, pupils, head, or other such features that can be indicative of at least a general point of view. In some embodiments, the device might look for an object held by or otherwise associated with a user to determine a general point of view for rendering. Further, in some embodiments a device might utilize at least two different cameras positioned on the device with a sufficient separation such that the device can utilize stereoscopic imaging (or anther such approach) to determine a relative position of one or more features, with respect to the device, in three dimensions. It should be understood that there can be additional imaging elements of the same or a different type at various other locations on the device as well within the scope of the various embodiments.

Software executing on the computing device (or otherwise in communication with the computing device) can obtain information such as the angular field of view of the camera, the zoom level at which the information is currently being captured, and any other such relevant information, which can enable the software to determine an approximate direction 410 of at least one of the user's eyes with respect to the camera. In many embodiments, direction information will be sufficient to provide adequate point-of-view dependent rendering. In at least some embodiments, however, it can also be desirable to determine distance to the user in order to provide a more consistent and accurate rendering. In some embodiments, methods such as ultrasonic detection, feature size analysis, luminance analysis through active illumination, or other such distance measurement approaches can be used to assist with position determination. In other embodiments, a second camera can be used to enable distance determinations through stereoscopic imaging. Once the direction vectors from at least two image capture elements are determined for a given feature, the intersection point of those vectors can be determined, which corresponds to the approximate relative position in three dimensions of the respective feature as known for disparity mapping and other such processes.

Figure 4B:
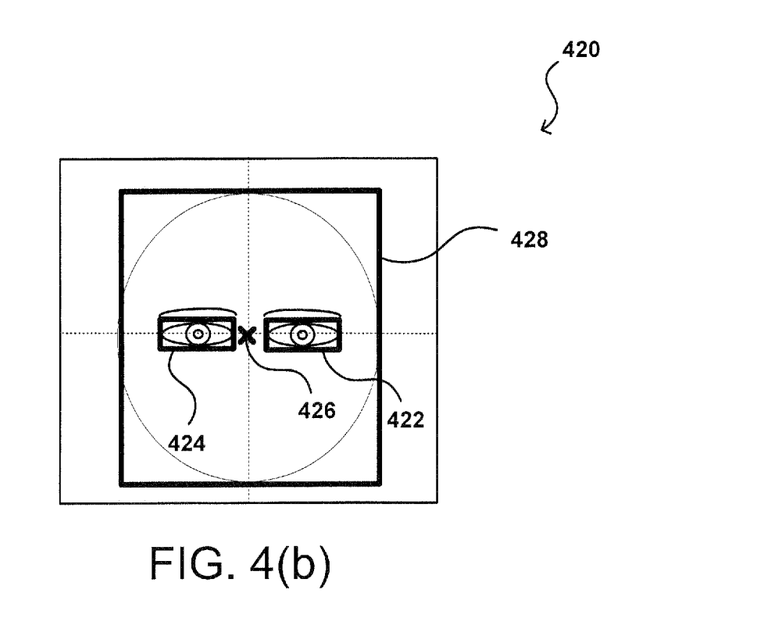

Further illustrating such an example approach, FIG. 4(b) illustrates an example image 420 that could be captured of the user's head and eyes using the camera 406 of FIG. 4(a). One or more image analysis algorithms can be used to analyze the image to perform pattern recognition, shape recognition, or another such process to identify a feature of interest, such as the user's eyes. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. As illustrated in this example, both eyes of the user might be able to be located in the captured image information. At least some algorithms are able to determine an approximate location or region 422, 424 for each eye, or at least an approximate location 428 of the user's head, where at least one of those locations or regions is used for point of view determinations. Depending on factors such as the desired level of sensitivity and distance between the user and the device, however, such information can impact the accuracy of the point of view determinations. Approaches in accordance with various embodiments can take advantage of the fact that the human brain combines and processes information from both eyes to provide a "single" point of view. Thus, the software can attempt to determine an intermediate point 426 between the user's eyes to use for the user's point of view. Various other approaches can be used as well, such as are discussed elsewhere herein. Once a relative location is determined in the image information, the device can use information such as the field of view of the camera, the position of the camera with respect to the device, the zoom level of the camera, and other such information to determine a relative direction of the user, with that relative direction being used for the point of view to use in rendering the interface.

When using a camera to track location, however, the accuracy is limited at least in part by the frame rate of the camera. Further, images take some time to process such that there can be some lag in the determinations. As changes in orientation of the device can occur relatively quickly, it can be desirable in at least some embodiments to enhance the accuracy of the point of view determinations. In some embodiments, a sensor or other such element of a computing device can be used to determine motions of the computing device, which can help adjust point of view determinations. The sensors can be any appropriate sensors capable of providing information about rotations and/or translations of the device, as may include accelerometers, inertial sensors, electronic gyroscopes, electronic compasses, and the like.

Figure 5A:
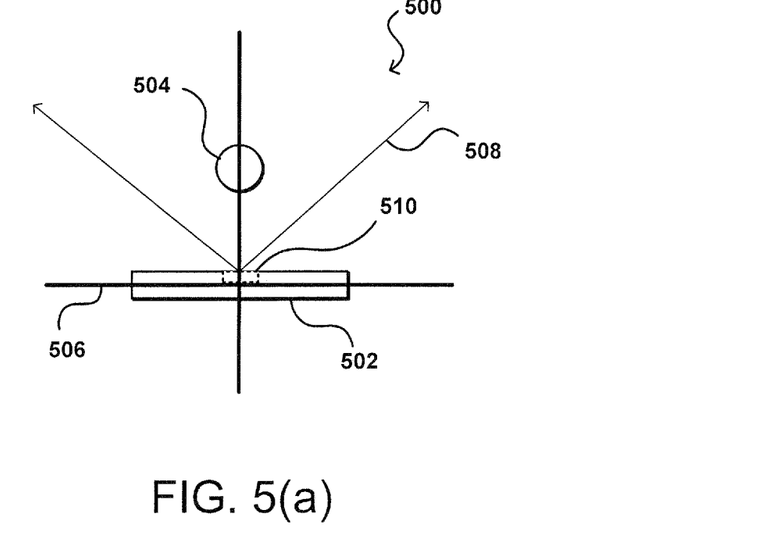
FIGS. 5(a) and 5(b) illustrate an example approach to determining device motion that can be utilized in accordance with various embodiments.

For example, FIG. 5(a) illustrates a "top view" 500 of a computing device 502 operable to capture an image of an object 504 (e.g., a user's head) within an angular view 508 of a camera 510 of the computing device. In this example, the computing device 502 includes at least one orientation- or rotation-determining element, such as an electronic compass or electronic gyroscope, that is able to determine a frame of reference 506 in two or three dimensions with respect to a first orientation of the device. In at least some embodiments, an electronic compass might be used to determine an axis of the frame of reference 506, as may correspond to a North direction, etc. In other embodiments, a component such as an electronic gyroscope might be calibrated periodically with a component such as a compass, but might instead determine changes in orientation along three axes of rotation over time. Various other approaches to determining changes in orientation along one, two, or three axes of rotation can be used as well within the scope of the various embodiments.

A first frame of reference 506 or orientation can be determined at or near the time of capture of a first image by a camera 510 of the computing device 502. In some embodiments, the determination can be triggered by receiving input to capture an image or another such action, but in other embodiments the frame of reference and/or orientation information can be updated periodically, such as several times a second based upon the type and/or configuration of the electronic gyroscope. The gyroscope can also be any appropriate electronic gyroscope component, such as a conventional MEMS gyroscope used in various consumer devices. Approaches for implementing and obtaining orientation changes from such a gyroscope are well known in the art and, as such, will not be discussed in detail herein.

Figure 5B:
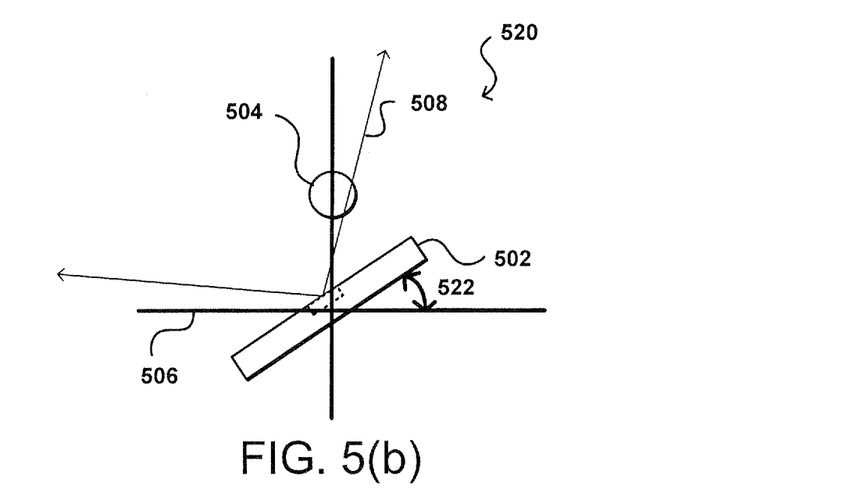

FIG. 5(b) illustrates a second top view 510 after a change in orientation of the computing device 502. The electronic gyroscope (or other such component or embedded sensor) can detect the change in orientation, in this example corresponding to a change in angle 512 with respect to the frame of reference in the plane of the figure. The gyroscope can present information about the change in orientation in any appropriate form, such as in angles or radians of change for one, two, or three degrees (e.g., $\Delta x$, $\Delta y$, $\Delta z$), percentage changes in pitch, roll, and yaw, etc. In this example, the change in orientation is determined to be a given angular amount of rotation 512 about a single axis. As illustrated, this causes the object 504 to be moved to the right edge of the field of view 508 of the camera 510. In at least some embodiments, the gyroscope may not be accurate enough to provide an exact amount of rotation, but can provide an approximation or estimate of the amount of rotation that can be used to narrow the search space and facilitate the location of corresponding objects in the images. Further, the information can provide a faster adjustment or prediction of relative position than can be provided from the camera in at least some embodiments. A similar approach can be used for translation, although the effects of translation on objects in captured images can be much less significant than angular changes, such that the image information might be sufficient to account for translation changes in at least some embodiments.

Figure 6:
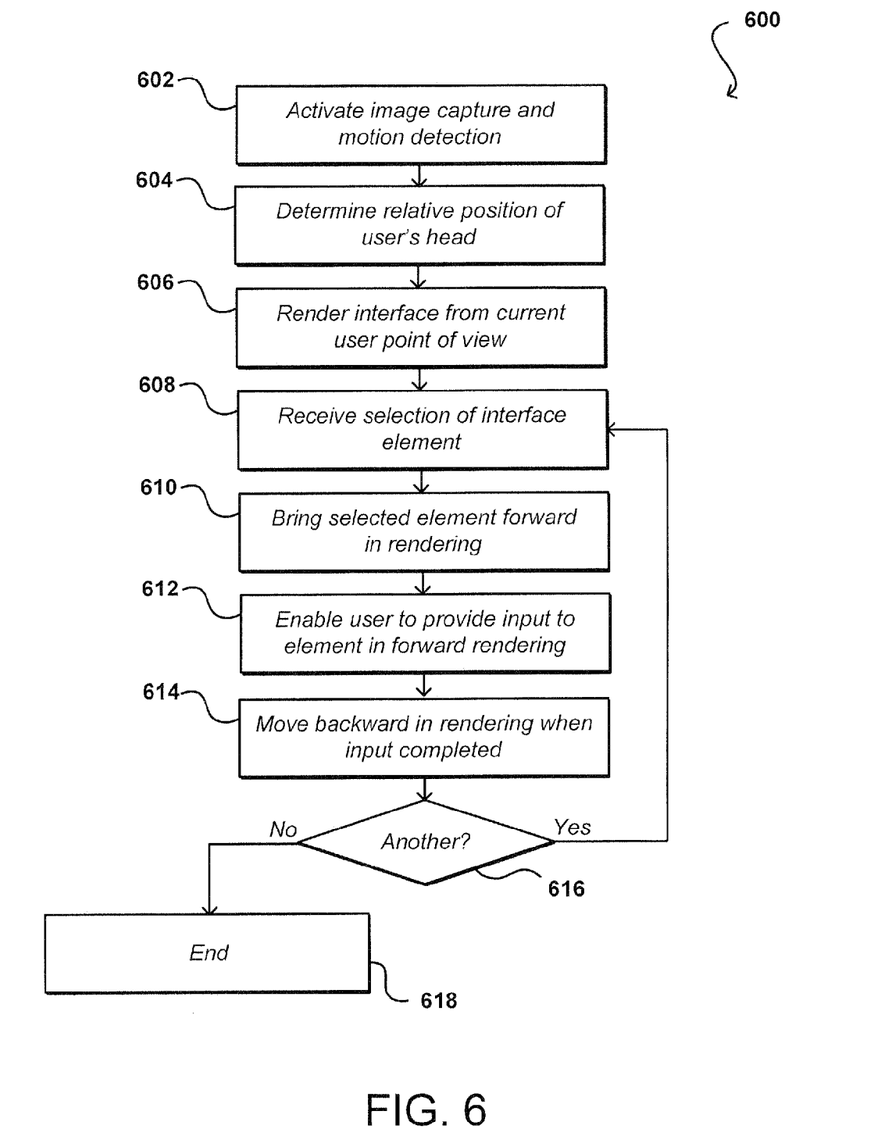
FIG. 6 illustrates an example process for enabling gesture input that can be used in accordance with various embodiments.

FIG. 6 illustrates an example process for providing point of view-dependent interface rendering that can be used in accordance with various embodiments. It should be understood that, for any process discussed herein, there can be additional, fewer, or alternative steps performed in similar or alternative orders, or in parallel, within the scope of the various embodiments unless otherwise stated. In this example, a point of view determination mode is activated 602 on the computing device, which in this example includes both image capture using at least one camera and motion detection using at least one motion sensor of the computing device. In some embodiments, the point of view determination mode can automatically be turned on whenever the computing device is active, even in a sleep mode or other such low power state. In other embodiments, the motion detection mode is activated automatically upon running an application or accessing an interface, or manually upon user selection. Various other activation events can be utilized as well.

The captured image information can be analyzed as discussed elsewhere herein to determine 604 a relative position of a user's head (or other such feature) with respect to the computing device. As discussed, the initial relative position can be determined using the image information, and changes in that relative position can be determined using a combination of the image information and the motion sensor information. For example, the motion sensor data can be used to update the point of view until additional position determination information is available from the image data, whereby any necessary correction or adjustment to the determination can be made. For the current relative user point of view, the interface can be rendered 606 such that the three-dimensional or multi-layer appearance, or other such aspect, is consistent for the user's current point of view.

When the interface is rendered to the user, a selection of an interface element can be received 608 from the user. As discussed, the rendering of the selected element can be adjusted to indicate that the selected element is active in the interface, in this example process involving bringing 610 the active element "forward" in the rendering such that the element appears to be closer to the surface of the display element. Bringing the element forward can involve, for example, adjusting a size, shape, shadowing, focus/blur, and/or coloring of the element. While the field is active, the user is enabled 612 to provide input to, or otherwise interact with, the active field. When the input is completed, or the user otherwise deselects that element or selects another element, the element can be moved 614 "backwards" or otherwise shown to be deselected, such as by performing an opposite or alternative adjustment to that which was perform when the element was shown to be active. If another element selection is received 616 from the user, that element can be shown to be active using similar adjustments. If not, and the user is done with the interface, etc., the rendering process for that interface can end 618.

In at least some processes, a user can also be able to provide speech input as discussed above. An icon or other indicator can be used to indicate to the user that speech input is available. In some embodiments, the user can select the icon in order to toggle speech input on and off, such that the user can use speech when in an appropriate environment, such as when alone in an office, and turn off speech input when in an environment where false positives are likely, such as when in a crowded area with other people speaking. In some embodiments, the device might only accept voice input while a user is actively pressing or otherwise interacting with the icon or another such element on the device. Various audio processing algorithms can be used to attempt to improve the accuracy of the audio input and recognition, such as by doing ambient noise reduction, voice recognition, etc. In some embodiments, a user can also use voice commands to select different fields to be active, or otherwise navigate or interact with the interface.

Further, in some embodiments the ability to make certain elements appear closer to the screen can be used for other purposes as well. For example, higher priority items (e.g., upcoming appointments or new messages) can be rendered at higher levels in the interface. Other approaches can be used as well, such as to bring unread messages to a higher level than read messages, new social network comments closer than old comments, etc. Various interface approaches can utilize aspects discussed and suggested herein as would be apparent to one of ordinary skill in the art in light of the teachings and suggestions contained herein.

Figure 7:
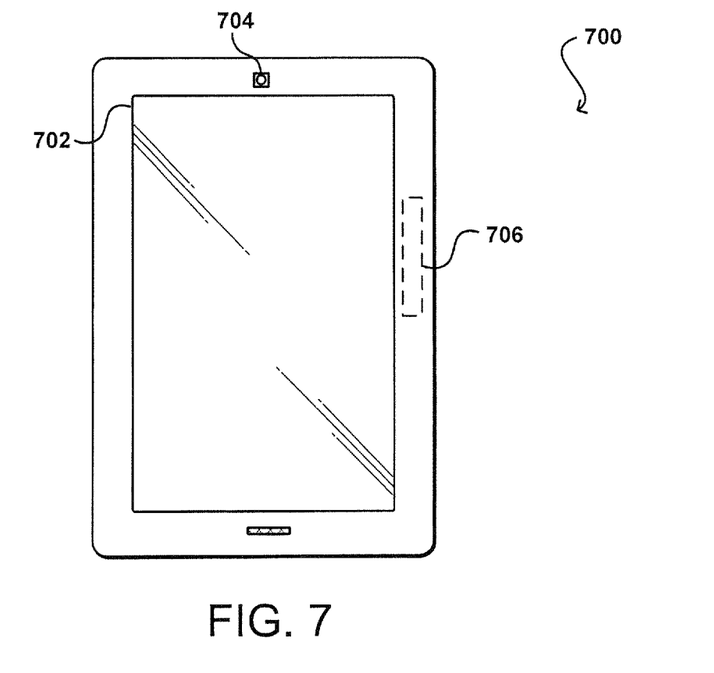
FIG. 7 illustrates an example device that can be used to implement aspects of various embodiments.

FIG. 7 illustrates an example computing device 700 that can be used in accordance with various embodiments. In this example, the device has a conventional digital camera 704 on a same side of the device as a display screen 702, enabling the device to capture image information about a user of the device during typical operation where the user is at least partially in front of the display screen. It should be understood that there can be additional cameras, sensors, or other such elements on the same or other sides or locations of the device as well within the scope of the various embodiments, such as may enable gesture or image input from any desired direction or location with respect to the device. The device can also include additional elements that can be used to assist with image capture, including a light sensor for determining an amount of light in a general direction of an image to be captured and an illumination element, such as a white light emitting diode (LED) or infrared (IR) emitter, for providing illumination in a particular range of directions when, for example, there is insufficient ambient light determined by the light sensor. Various other elements and combinations of elements can be used as well within the scope of the various embodiments as should be apparent in light of the teachings and suggestions contained herein. The device also includes at least one motion sensor 706 operable to determine rotations and/or translations of the device, for use in point of view determinations as discussed herein.

Figure 8:
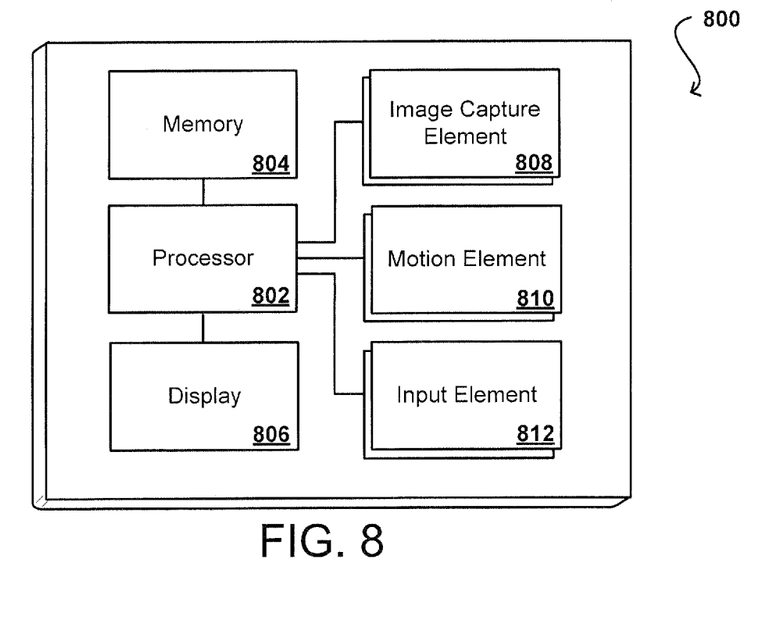
FIG. 8 illustrates example components that can be used with a device such as that illustrated in FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determine resolution, focal range, viewable area, and capture rate. The device also includes at least one motion determining element 810, such as an inertial sensor, accelerometer, electronic gyroscope, or electronic compass operable to provide information about an orientation of the device, as well as information about rotations or translations of the device. The processor 802 can utilize information from the cameras and motion sensors to determine point of view changes in accordance with various embodiments.

The example device can include at least one additional input device 812 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
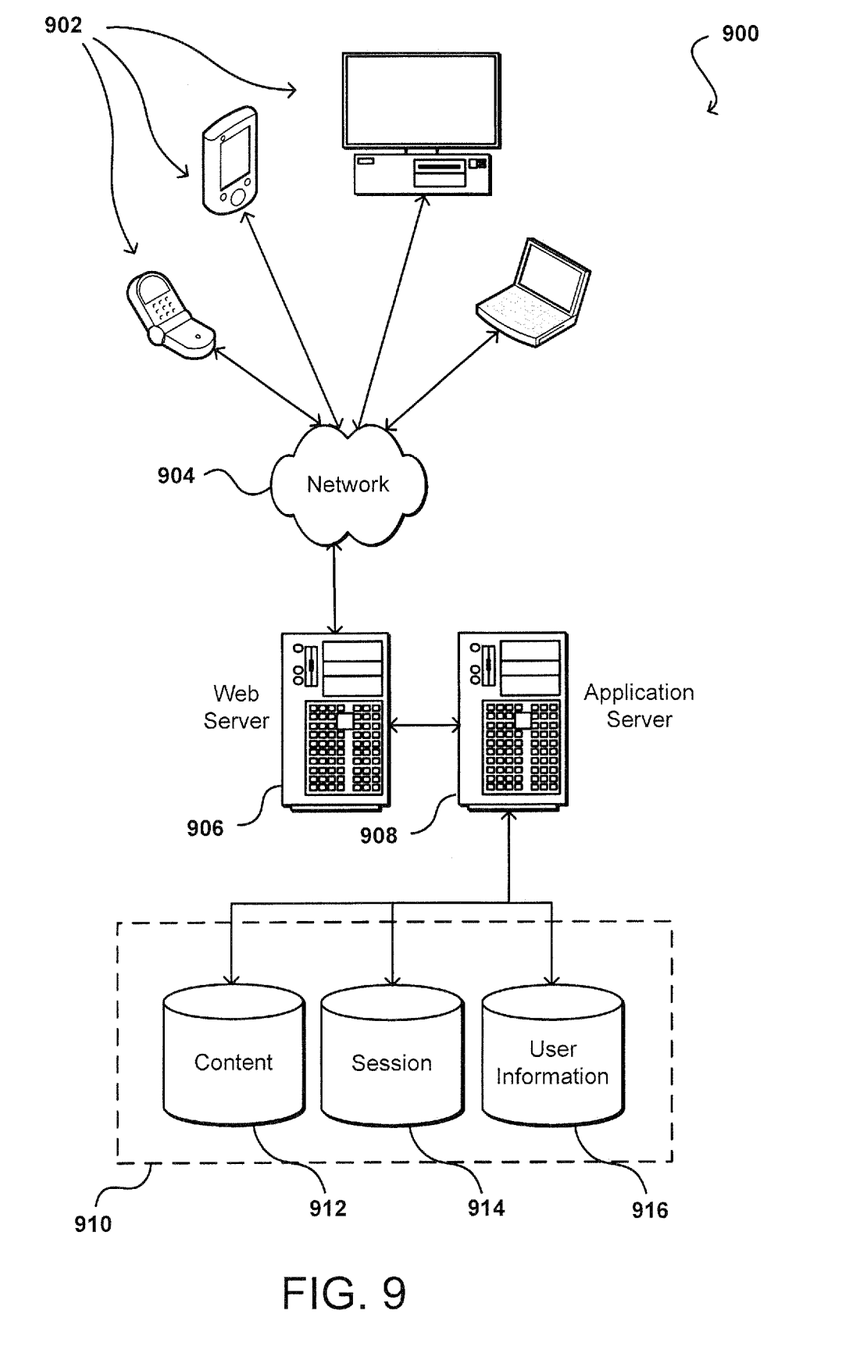
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of rendering an interface, comprising:
    capturing an image including a representation of a user using a camera of a computing device;
    analyzing, using at least one processor of the computing device, the image to determine a first position of the user with respect to the computing device;
    rendering a plurality of interface elements for display on a display screen of the computing device;
    receiving a selected interface element of the plurality of interface elements;
    determining, based at least in part on the first position of the user, that the user is not substantially perpendicular with respect to the display screen of the computing device;
    adjusting a first appearance of the selected interface element to cause the selected interface element to appear, from the first position of the user, to be positioned closer to a surface of the display screen than unselected interface elements of the plurality of interface elements;
    adjusting a second appearance of an unselected interface element of the unselected interface elements to cause the unselected interface element to appear, from the first position of the user, to be positioned further from the surface of the display screen than the selected interface element by reducing a second size associated with the second appearance of the unselected interface element to be smaller than a first size associated with the first appearance of the selected interface element;
    displaying a shadow of the selected interface element at a first shadow display position with respect to the selected interface element based at least in part on the first position of the user;
    displaying a side wall of the unselected interface element at a first sidewall display position with respect to the unselected interface element based at least in part on the first position of the user, a first depth of the side wall being related to the first position of the user;

determining a second position of the user relative to the computing device, the second position being different from the first position and not substantially perpendicular with respect to the display screen of the computing device;

displaying the shadow of the selected interface element at a second shadow display position with respect to the selected interface element based at least in part on the second position of the user;

displaying the side wall of the unselected interface element at a second side wall display position with respect to the unselected interface element based at least in part on the second position of the user, a second depth of the side wall being related to the second position of the user; and updating appearances of the plurality of interface elements based at least in part on the second position of the user.

2. The computer-implemented method of claim 1, wherein the second position of the user is determined based at least in part upon analyzing additional images captured by the camera at subsequent points in time.

3. The computer-implemented method of claim 1, wherein the second position of the user is determined based at least in part upon a change in an orientation of the computing device as determined by at least one sensor.

4. The computer-implemented method of claim 1, wherein adjusting the first appearance of the selected interface element includes adjusting at least one of a size, a shape, a color, a shading, or a blur of the selected interface element.

5. The computer-implemented method of claim 1, further comprising:

displaying an icon for the selected interface element indicating to the user that the computing device is configured to accept audio input associated with the selected interface element.

6. A computing device, comprising:

a processor;

a display screen; and memory including instructions that, when executed by the processor, cause the computing device to:

render a graphical interface for display on the display screen, the graphical interface including a plurality of interface elements;

receive a selected interface element of the plurality of interface elements from a user of the computing device;

determine a first position of the user with respect to the computing device, the first position of the user indicating that the user is not substantially perpendicular with respect to the display screen;

adjust a first rendering of the selected interface element to appear as if the selected interface element is a distance closer to the user than at least one other displayed interface element based at least in part upon the first position of the user;

adjust a second rendering of an unselected interface element of the plurality of interface elements to appear as if the unselected interface element is a distance further from the user than the selected interface element by reducing a second size associated with the second rendering of the unselected interface element to be smaller than a first size associated with the first rendering of the selected interface element;

render a shadow of the selected interface element at a first shadow display position with respect to the selected interface element based at least in part on the first position of the user;

render a side wall of the unselected interface element at a first side wall display position with respect to the unselected interface element based at least in part on the first position of the user, a first depth of the side wall being related to the first position of the user;

determine a second position of the user, the second position being different from the first position and not substantially perpendicular with respect to the display screen;

display the shadow of the selected interface element at a second shadow display position with respect to the selected interface element based at least in part on the second position of the user;

display the sidewall of the unselected interface element at a second sidewall display position with respect to the unselected interface element based at least in part on the second position of the user, a second depth of the side wall being related to the second position of the user; and update a respective rendering of the plurality interface elements based at least in part on the second position of the user.

7. The computing device of claim 6, further comprising:

a camera positioned to capture images of at least a portion of the user, wherein the instructions that cause the computing device to determine the first position and the second position include causing the computing device to analyze the images using the processor of the computing device.

8. The computing device of claim 6, further comprising:

a sensor configured to detect changes in at least one of an orientation or a position of the computing device, wherein the instructions that cause the computing device to determine the first position and the second position include causing the computing device to analyze the changes using the processor of the computing device.

9. The computing device of claim 6, further comprising:

a microphone configured to accept audio input from the user, the selected interface element including a graphical element indicating that the audio input is able to be provided for the selected interface element.

10. The computing device of claim 6, wherein the display screen is touch sensitive and the selected interface element is received through contact with the display screen.

11. A non-transitory computer-readable storage medium storing instructions that, when executed by at least one processor of a computing device, cause the computing device to:

render a graphical interface for display on a display screen of the computing device, the graphical interface including a plurality of interface elements;

receive a selected interface element of the plurality of interface elements from a user of the computing device;

determine a first position of the user with respect to the computing device, the first position of the user indicating that the user is not substantially perpendicular with respect to the display screen of the computing device;

adjust a first rendering of the selected-interface element to appear as if the selected interface element is a closer to a surface of the display screen than at least one non-selected interface element of the plurality of interface elements based at least in part upon the first position of the user;

adjust a second rendering of an unselected interface element of the plurality of interface elements to appear as if the unselected interface element is a distance further from the user than the selected interface element by reducing a second size associated with the second rendering of the unselected interface element to be smaller than a first size associated with the first rendering of the selected interface element;

render a shadow of the selected interface element at a first shadow display position with respect to the selected interface element based at least in part on the first position of the user;

render a side wall of the unselected interface element at a first side wall display position with respect to the unselected interface element based at least in part on the first position of the user, a first depth of the side wall being related to the first position of the user;

determine a second position of the user, the second position being different from the first position and not substantially perpendicular with respect to the display screen of the computing device;

display the shadow of the selected interface element at a second shadow display position with respect to the selected interface element based at least in part on the second position of the user;

display the sidewall of the unselected interface element at a second sidewall display position with respect to the unselected interface element based at least in part on the second position of the user, a second depth of the side wall being related to the second position of the user; and update a respective rendering of the plurality interface elements based at least in part on the second position of the user.

12. The non-transitory computer-readable storage medium of claim 11, wherein the instructions when executed further cause the computing device to:

animate a change in at least one of a size, shape, coloring, or blur level of the selected interface element.

13. The non-transitory computer-readable storage medium of claim 11, wherein the instructions when executed further cause the computing device to:

adjust at least one of a size, a shape, a color, a shading, or a blur of the selected interface element.

14. The non-transitory computer-readable storage medium of claim 11, wherein the instructions when executed further cause the computing device to:

capture image information of the user using a camera of the computing device; and analyze the image information to recognize a facial feature of the user in the image information, wherein the first position and the second position of the user with respect to the computing device are determined based at least in part upon a position of the recognized facial feature.

15. The computer-implemented method of claim 1, further comprising:

analyzing the image to recognize a facial feature of the user in the captured image, wherein the first position and the second position of the user with respect to the computing device are determined based at least in part upon a position of the facial feature.

16. The computing device of claim 6, wherein the instructions when executed further cause the computing device to:

adjust at least one of a size, a shape, a color, a shading, or a blur of the selected interface element.

17. The computing device of claim 6, wherein the instructions when executed further cause the computing device to:

render an icon for the selected interface element indicating to the user that the computing device is configured to accept audio input associated with the selected interface element.

18. The non-transitory computer-readable storage medium of claim 11, wherein the second position of the user is determined based at least in part upon analyzing additional images captured by a camera of the computing device at subsequent points in time.

19. The non-transitory computer-readable storage medium of claim 11, wherein the second position of the user is determined based at least in part upon a change in an orientation of the computing device as determined by at least one sensor.

20. The non-transitory computer-readable storage medium of claim 11, wherein the instructions when executed further cause the computing device to:

render an icon for the selected interface element indicating to the user that the computing device is configured to accept audio input associated with the selected interface element.

21. The computer-implemented method of claim 1, wherein adjusting the second appearance of the unselected interface element includes reducing a second color intensity associated with the second appearance of the unselected interface element to be lighter than a first color intensity associated with the first appearance of the selected interface element.

22. The computing device of claim 6, wherein the instructions upon being executed further cause the computing device to:

reduce a second color intensity associated with the second rendering of the unselected interface element to be lighter than a first color intensity associated with the first rendering of the selected interface element.

* * * * *